(12) United States Patent
Liu et al.

(10) Patent No.: US 7,983,496 B2
(45) Date of Patent: Jul. 19, 2011

(54) INVERSE TONE MAPPING FOR BIT-DEPTH SCALABLE IMAGE CODING ADAPTED TO VARIABLE BLOCK SIZES

(75) Inventors: Shan Liu, Cambridge, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 812 days.

(21) Appl. No.: 12/039,007

(22) Filed: Feb. 28, 2008

(65) Prior Publication Data

US 2009/0003718 A1    Jan. 1, 2009

Related U.S. Application Data

(63) Continuation-in-part of application No. 11/768,434, filed on Jun. 26, 2007.

(51) Int. Cl.
*G06K 9/36* (2006.01)

(52) U.S. Cl. ...................................................... 382/232

(58) Field of Classification Search .................. 382/162, 382/167, 232–233, 248, 250, 254, 274; 375/240.2; 358/1.9, 2.1, 504, 518
See application file for complete search history.

(56) References Cited

U.S. PATENT DOCUMENTS

| | | | | |
|---|---|---|---|---|
| 5,189,511 | A * | 2/1993 | Parulski et al. | 358/518 |
| 7,627,187 | B2 * | 12/2009 | Bossen | 382/250 |
| 7,881,554 | B2 * | 2/2011 | Castorina et al. | 382/274 |

\* cited by examiner

*Primary Examiner* — Jose Couso
(74) *Attorney, Agent, or Firm* — Dirk Brinkman; Gene Vinokur

(57) ABSTRACT

A method performs inverse tone mapping of an image in a decoder. For each block of each color channel of the image a scaling factor is determined by adding a predicted scaling factor for the current block to a difference between the predicted scaling factor and the scaling factor of an adjacent block. An offset value for the current block is determined by adding a predicted offset for the current block to a difference between the predicted offset value and the offset value of the adjacent block. The scaling factor and the offset value are applied to pixel intensity values of the current block to produce a mapped block. The inverse tone mapping can also be applied to blocks of different sizes.

11 Claims, 8 Drawing Sheets

700

INVERSE TONE MAPPING FOR BIT-DEPTH SCALABLE IMAGE CODING ADAPTED TO VARIABLE BLOCK SIZES

RELATED APPLICATION

This Continuation-in-Part application claims priority to U.S. patent application Ser. No. 11/768,434, filed by Liu et al. on June, 26, 2007.

FIELD OF THE INVENTION

The invention relates generally to encoding and decoding images, and more particularly to encoding and decoding of a sequence of images with scalable bit-depths.

BACKGROUND OF THE INVENTION

In computer graphics, tone mapping changes the dynamic range of images. For example, tone mapping can change a high dynamic range (HDR) image to an image with a low dynamic range (LDR), or vice versa. In images, the dynamic range is determined by the number of bits (bit-depth) allocated to store pixel intensity values. Tone mapping attempts to avoid strong contrast reduction from scene radiance values to a renderable range while preserving image appearance.

Conventional video coding schemes, such as the MPEG, and ITU series of video coding standards, are well suited for the compression of videos with a fixed bit-depth, e.g., 8 bits per pixel (bpp). Consumer videos available on VHS and DVD, and digital television broadcasts are typically 8 bpp, and are referred to as having a low dynamic range (LDR). Videos with higher bit-depth, e.g., 10 to 24 bpp, are typically used for professional applications, and have a high dynamic range (HDR).

FIG. 1 shows a conventional encoder 100 with motion estimation 110. Input to the encoder is a fixed bit-depth sequence of images or video 101. Frames (images) in the video are partitioned into blocks, e.g., 8×8 or 16×16 pixels. Blocks are processed one at a time. A motion estimator 110 determines a best matching block of a reference frame stored in a frame memory 111 for a current block to be encoded. This best matching block serves as a prediction frame for the current block. A corresponding motion vector 112 is entropy encoded 150. A difference signal 122 between the current block of the input video and a predicted block 121 is determined 120, which is generated by a motion-compensated predictor 130. The difference signal then undergoes a transform/quantization process 140 to yield a set of quantized transform coefficients (texture) 141. These coefficients are entropy encoded 150 to yield a compressed output bitstream 109. Performing an inverse transform/quantization 160 on the quantized transform coefficients 121 and adding 170 the result to the motion compensated prediction 121 generates the reconstructed reference frame 161, which is stored in the frame memory 111 and used for predicting 130 of successive frames of the input video 101. The output encoded bitstream 109 is generated based on the entropy encoding 150 of motion vectors 112 and texture (DC coefficients) 141.

FIG. 2 shows a conventional decoder 200. An input encoded bitstream 201 is subject to an entropy decoder 210 that yields both quantized transform coefficients 211 as well as corresponding motion vectors 212. The motion vectors are used by a motion compensated predictor 220 to yield a prediction signal 221. The quantized transform coefficients 211 are inverse transform/quantized 230 and added 240 to the prediction signal 221 to yield a reconstructed fixed (single) bit-depth video 209. Frames of the reconstructed video, which are used for decoding successive frames, are stored to a frame memory 250. The combination of the encoder and decoder is known as a codec.

The above scheme achieves excellent compression efficiency when the input images have a fixed bit-depth. Currently, most consumer display can only render LDR 8 bpp videos. Therefore, conventional coding schemes can be applied directly.

To view videos with higher bit-depths, HDR display devices are required. Advances in display technology are making it possible for consumers to enjoy the benefits of HDR videos in the near future. To efficiently support both LDR and HDR display devices, a scalable representation of the video, which enables reconstruction for both or either of the LDR video and the HDR video, is required.

One method achieves a scalable representation by compressing the input HDR video and an LDR version in two separate passes, i.e., using a fixed bit-depth HDR encoder and a fixed bit-depth LDR encoder, respectively. This is referred to as simulcast coding. However, the compression efficiency of that method is very low due to the redundancy of the HDR and LDR versions. Also, the computational complexity is very high. A bit-depth scalable video compression scheme is described by Winken et al. in "SVC bit-depth scalability," Joint Video Team of ISO/IEC MPEG & ITU-T VCEG, Doc. JVT-V078, $22^{nd}$ Meeting, January 2007.

FIG. 3 shows a bit-depth scaleable encoder 300. An input HDR video 301 is down-converted to an LDR video 101 using tone mapping 310. Then, the LDR video 101 is compressed to produce a base layer 109. Each current reconstructed frame 115 from the base layer is up-converted to the bit-depth of the input video 301 using inverse tone mapping 320 to produce an inverse tone mapped frame 321. The difference between the inverse tone mapped frame 321 and the input HDR frame 301 is determined 329, and the difference signal then undergoes a transform/quantization process 330 to yield a set of quantized transform coefficients 331. These coefficients are entropy encoded 340 to yield an enhancement layer 341. The enhancement layer bitstream 341 is multiplexed 350 with the base layer bitstream 109 to generate the output bit-depth scalable bitstream 309.

FIG. 4 shows the corresponding decoder 400. An input encoded bitstream 401 is demultiplexed 410 into a base layer 201 and an enhancement layer 402. The base layer is decoded as described above. The enhancement layer is also entropy decoded 210 and inverse transform/quantized to produce output 431. In this case, the output of the frame memory 250 is inverse tone mapped 420, and the output of the tone mapping is added to the output 431 to produce a reconstruction 409 of the input video 101.

In a prior art bit-depth scalable video codec, three methods for inverse tone mapping 320 are known, including: linear scaling, linear interpolation, and look-up table mapping. All of those methods apply the same inverse tone mapping to all of the frames in the entire video, which would not perform well when the LDR video is generated by localized or region-based tone mapping 310 methods from the HDR video.

In fact, localized tone mapping methods are used in many applications with regions of interest (ROI). Furthermore, the linear scaling and linear interpolation methods are relatively coarse, which result in poor inverse tone mapping quality, even for globally tone mapped LDR video. The look-up table mapping achieves better inverse tone mapping results, but requires an initial training to build a mapping of pixel intensity values by examining an entire video sequence. This process is very complex and results in considerable initial delay before decoding and display, and would not be suitable for many real-time applications. Also, that method does not perform well for many ROI applications.

Another inverse tone mapping method is described by Segall and Su, in "System for bit-depth scalable coding," Joint Video Team of ISO/IEC MPEG & ITU-T VCEG, Doc. JVT-W113, April 2007. In that method, two scale factors are used, one for luminance and the other for chrominance components. The scaling factors are assigned to each block to perform the inverse tone mapping. Thus, that method is more suitable for ROI applications. As a major disadvantage, the scale factors are predefined as a set {0.5, 1, 1.5, 2, 2.5, 3, 3.5, 4, 4.5}, where the set of scale factor is suitable for input video at a particular bit-depth. Hence, the method loses the flexibility of compressing HDR videos with various bit-depths. Another disadvantage is that the identical scaling factor is used for all chrominance components. This can degrade the inverse tone mapping quality.

Clearly, it is desirable to have an inverse tone mapping that fits into a bit-depth scalable video compression scheme and overcomes the disadvantages of the prior art. Specifically, an inverse tone mapping technique is needed that yields high quality, is compatible with a wide range of tone mapping techniques, and does not incur substantial coding overhead.

SUMMARY OF THE INVENTION

A method and system perform inverse tone mapping of an image in a decoder. For each block of each color channel of the image the following steps are performed.

A scaling factor is determined for a current block of the image by adding a predicted scaling factor for the current block to a difference between the predicted scaling factor and the scaling factor of an adjacent block.

An offset value for the current block is determined by adding a predicted offset for the current block to a difference between the predicted offset value and the offset value of the adjacent block.

The scaling factor and the offset value are applied to pixel intensity values of the current block to produce a mapped block in which a bit-depth of the mapped block is greater than the bit-depth of the current block.

DETAILED DESCRIPTION OF THE PREFERRED EMBODIMENT

Our invention provides a system and a method for converting between bit-depth representations of images and videos using tone mapping. The bit-depth conversion can be either from low to high (LDR→HDR) or from high to low (HDR→LDR). The image and video can be both one-channel monochrome, and multi-channel color. The block dimensions can be variable. The method uses the following parameters, a scaling factor, an offset value, and a prediction direction. The parameters are determined for each block in each color channel. We also describe a process for determining the optimal scaling factor. In contrast to conventional methods, which fix or limit the set of scaling factors, our scaling factors can be customized and the range of the scaling factors can be increased adaptively and dynamically in order accommodate a larger dynamic range in the images. The corresponding offset value and prediction direction are determined from the scaling factor.

To code the scaling factors and offset values efficiently in an encoded bitstream, taking into account the correlation that exists among adjacent blocks, each block is associated with one prediction direction for each color channel. The scaling factor and offset value for the current block are predicted from the scaling factors and offset values of (predicted) adjacent blocks.

The embodiments of the invention are described for an up-conversion, i.e., from a LDR video to a HDR video. The invention can also be used for a down-conversion from a HDR video to a LDR video, in which case the LDR and HDR terms should be reversed in the following description.

Inverse Tone Mapping in the Encoder

Figure 5:
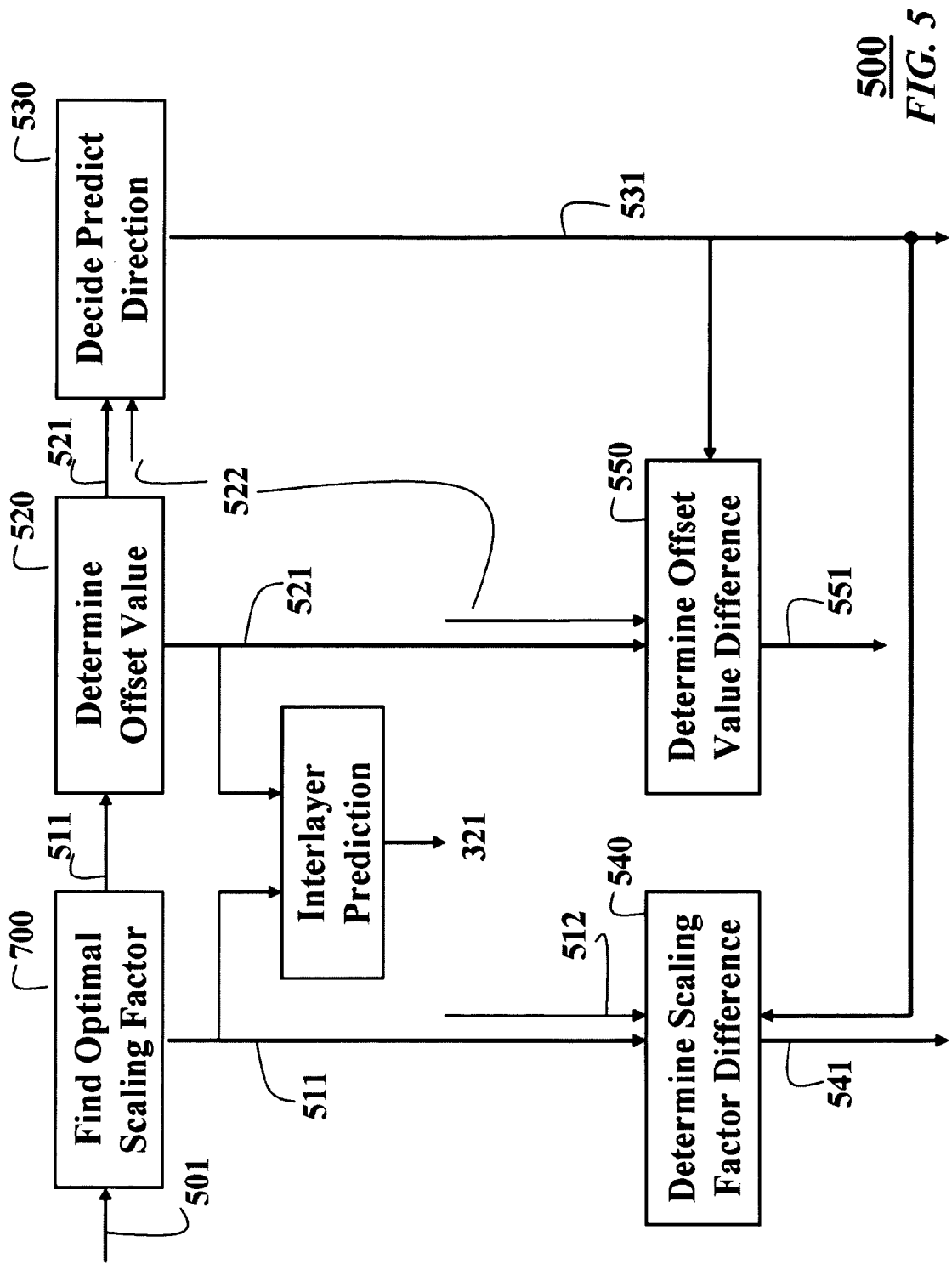
FIG. 5 is a block diagram of inverse tone mapping in an encoder according to an embodiment of the invention.

FIG. 5 shows an inverse tone mapping process according to an embodiment of the invention. The inverse tone mapping can be substituted for functional step 320 in FIG. 3. The tone mapping is applied to pixel intensity values 501 of each block and each color channel of each image to be converted.

Inputs to the method are the pixel intensity values 501 of a particular block. First, an optimal scaling factor 511 is determined 700 among a set of candidate scaling factors. For up-conversion the scaling factors are generally 1 or greater, and for down-conversion the factors are 1 or less. However, because the conversion also considers the factors, a strict adherence to the above scaling factor ranges is not required as long as the desired conversion is achievable.

The process 700 for determining the optimal scaling factor is described below. The offset value 521 is determined 520 as a mean of a difference between the up-scaled LDR pixel intensity values, using the optimal scaling factor 511, and the pixel intensity values in the current block 501.

In one embodiment of the invention, a prediction direction of the scaling factor follows a prediction direction of the offset value. The current offset value 521 is compared with reference (LEFT or ABOVE) offset values 522 of adjacent blocks. If the LEFT (block) offset value is closer to the current offset value 521, the prediction direction 531 is set as LEFT; otherwise, the prediction direction is set as ABOVE.

In another embodiment of the invention, the prediction direction of the offset value follows the prediction direction of the scaling factor. The current scaling factor is compared with the neighboring reference (LEFT or ABOVE) scaling factor. If the LEFT scaling factor is closer to the current scaling factor, the prediction direction 531 is set as LEFT; otherwise, the prediction direction is set as ABOVE.

The prediction direction can also be based on a function of differences of both the scaling factors and offset values between adjacent blocks. For instance, a weighted function of scaling and offset differences can be used.

Based on the prediction direction 531, the predicted scaling factor 512 is set as either the LEFT or ABOVE scaling factor and the predicted offset value 522 is set as either the LEFT or ABOVE offset value. A scaling factor difference 541 of the current scaling factor 511 and the predicted scaling factor 512 is determined 540. An offset value difference 551 of the current offset value 521 and the predicted offset value 522 is determined 550.

Figure 1:
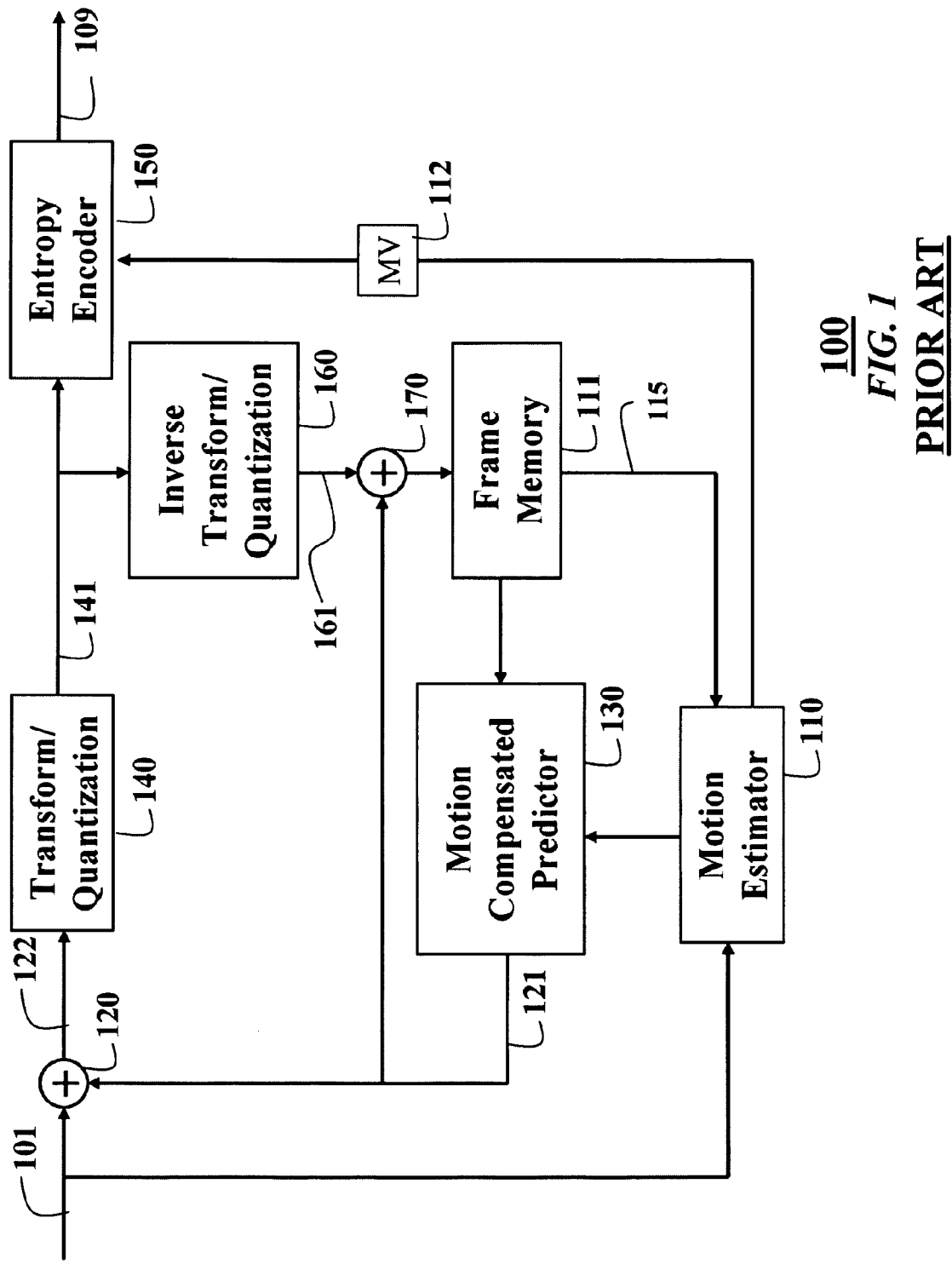
FIG. 1 is a block diagram of a prior art video encoder.
Figure 2:
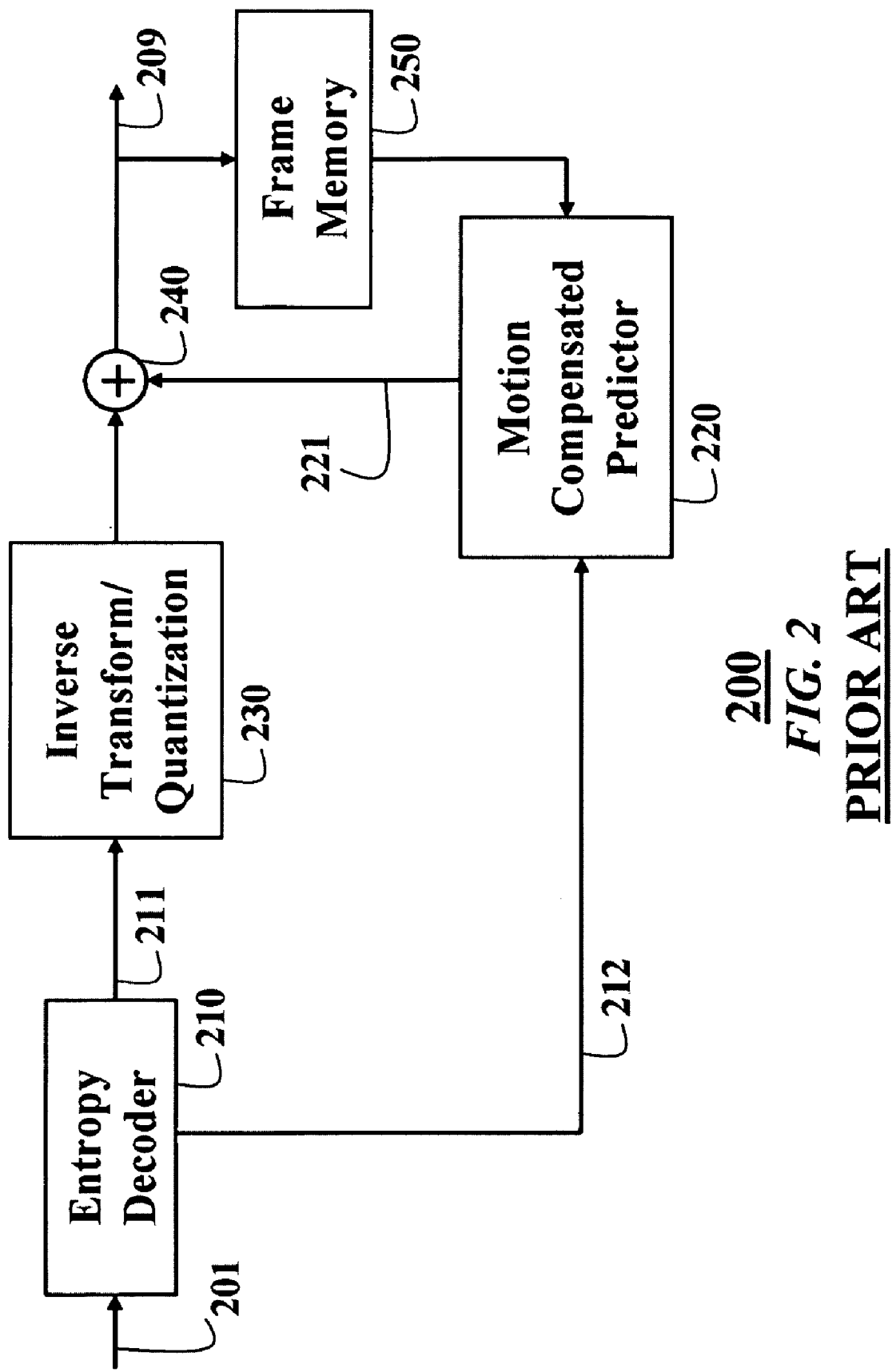
FIG. 2 is a block diagram of a prior art video decoder.
Figure 3:
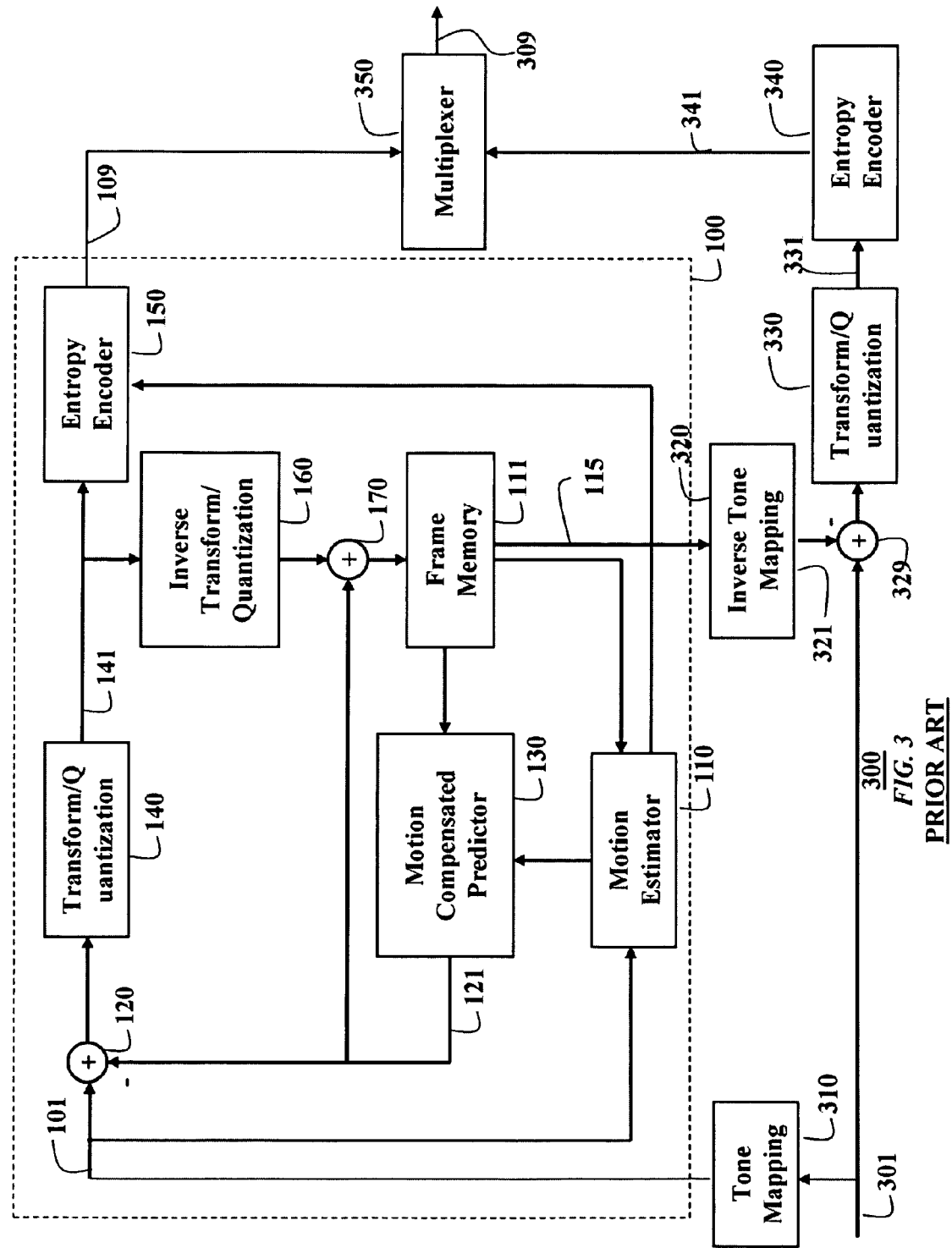
FIG. 3 is a block diagram of a prior art video encoder with bit-depth scalability.

The prediction direction 531, scaling factor difference 541, and the offset difference 551 are entropy encoded 340, see FIG. 3, and the resulting encoded bits are added 350 to the output bitstream 309.

For each pixel, an inter-layer predicted value 321 is determined by multiplying the scaling factor 511 with the LDR pixel intensity value and adding the offset value 521.

To reduce the overhead associated with each block, the prediction direction can also be derived from information present in the decoder. For example, the prediction direction can be determined according to the reconstructed DC coefficients of the current block and spatially neighboring blocks. The DC coefficient of the current block is compared with reference (LEFT or ABOVE) DC coefficients of adjacent blocks. If the LEFT DC coefficient is closer to the current DC coefficient, then the prediction direction 531 is set as LEFT; otherwise, the prediction direction 531 is set as ABOVE. When the prediction direction is determined in this implicit way, it does not need to be explicitly coded into the output bitstream.

Inverse Tone Mapping in the Decoder

Figure 4:
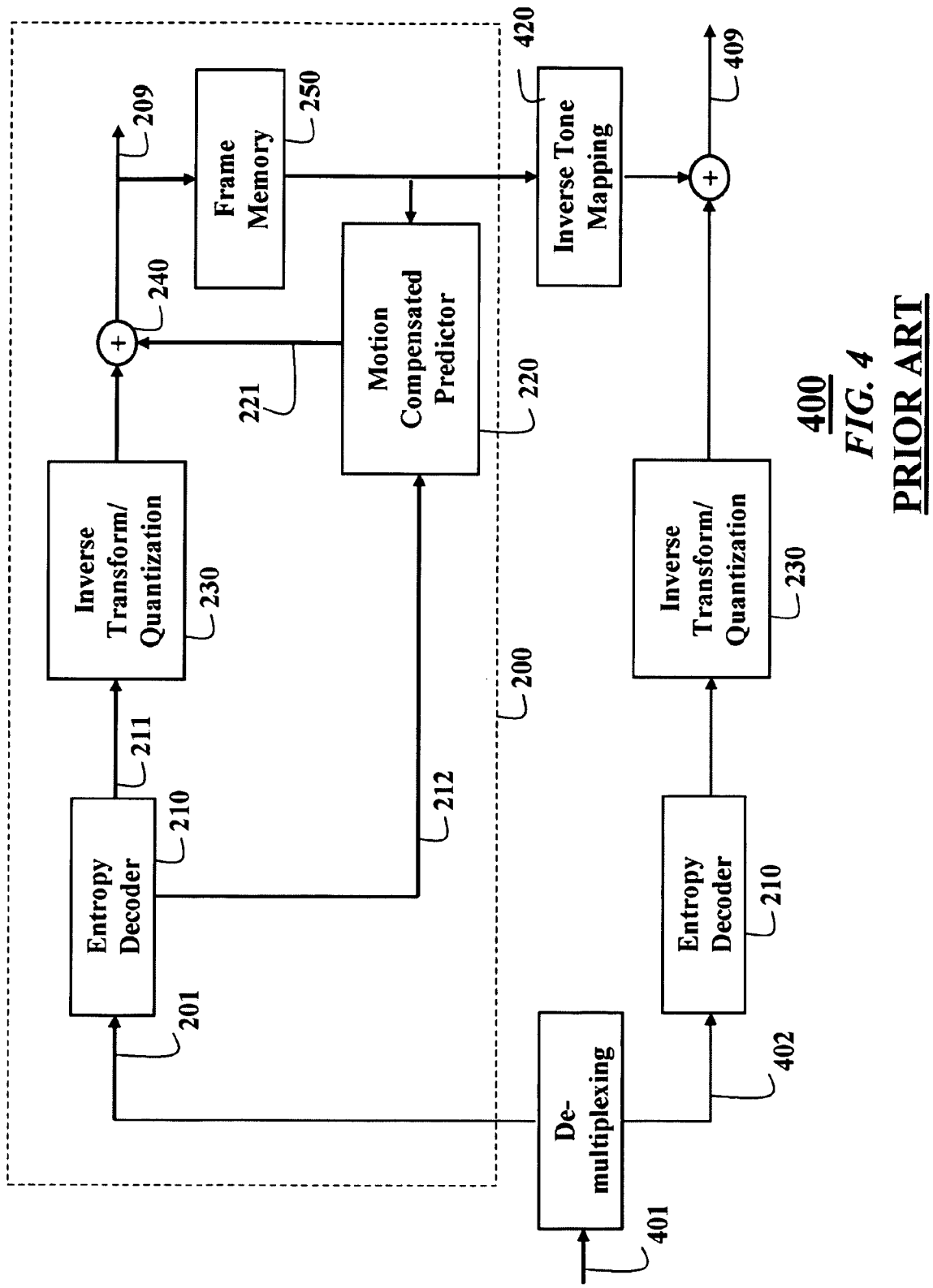
FIG. 4 is a block diagram of a prior art video decoder with bit-depth scalability.
Figure 6:
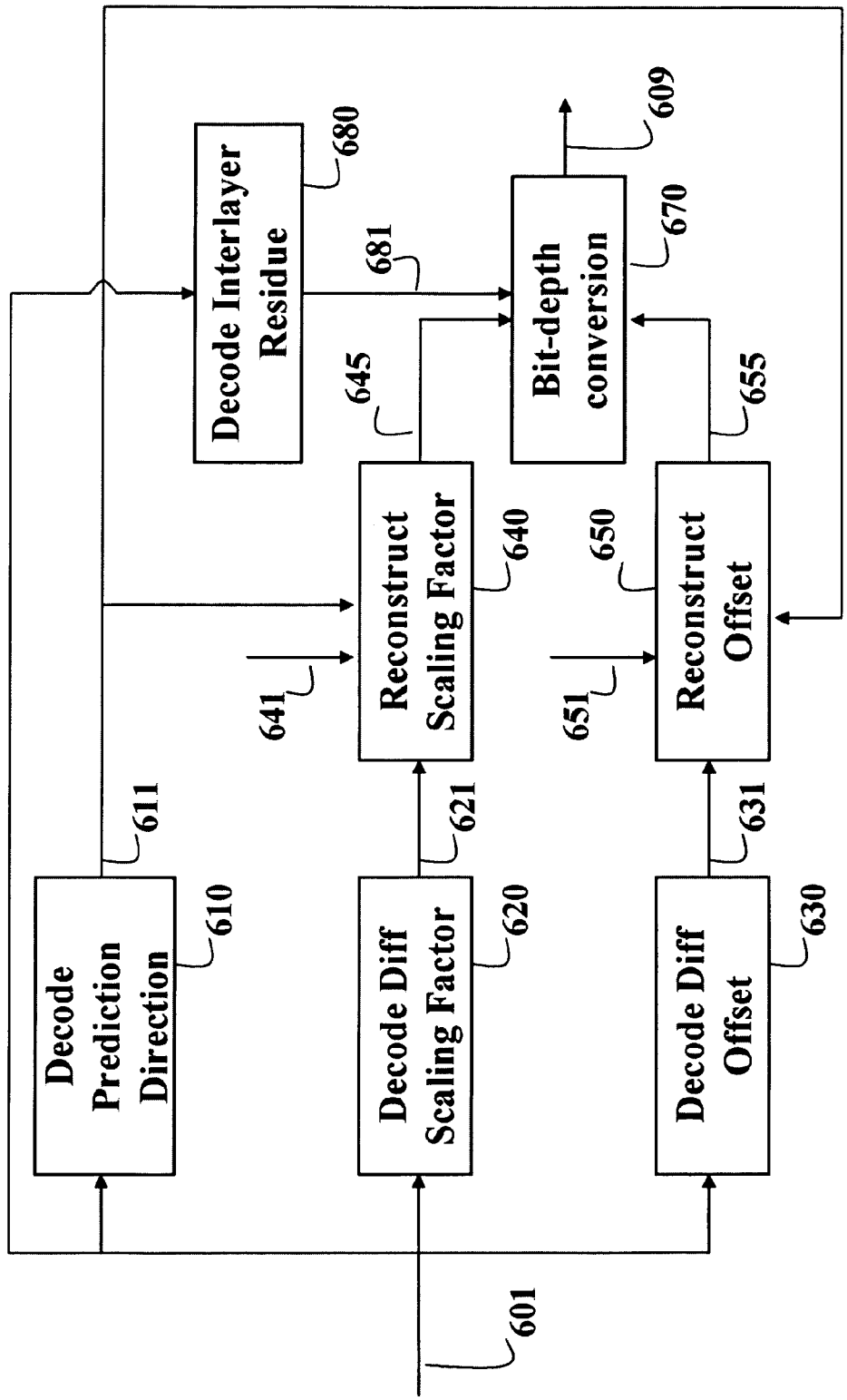
FIG. 6 is a block diagram of inverse tone mapping in a decoder according to an embodiment of the invention.

FIG. 6 illustrates the inverse tone mapping according to and embodiment of the invention the invention, which is applied for each block of each color channel and within the scope of the bit-depth scalable decoder 400. The tone mapping can be substituted for functional step 420 in FIG. 4. As stated above the mapping can be for up- or down-conversion.

In one embodiment of the invention, the prediction direction 611, the scaling factor difference 621, and the offset value difference 631 for the current block for each color component are entropy decoded by steps 610, 620 and 630, respectively, from the input bit-depth scalable encoded bitstream 601.

In another embodiment of the invention, the prediction direction 611 is derived from the DC coefficients of spatially neighboring blocks. For instance, if the LEFT DC coefficient is closer to the current DC coefficient, then the prediction direction 611 is set as LEFT; otherwise, the prediction direction 611 is set as ABOVE.

According to the prediction direction 611, the predicted scaling factor 641 and the predicted offset value 651 are obtained from either the LEFT adjacent block, or the ABOVE. A scaling factor 645 of the current block is reconstructed 640 by adding the scaling factor difference 621 to the predicted scaling factor 641. The offset value 655 of current block 655 is reconstructed 650 by adding the offset value difference 631 to the predicted offset value 651.

The inter-layer residue 681 are entropy decoded 680.

The bit-depth conversion 670 multiplies each pixel intensity value by the scaling factor 645, and adds the offset value 655 and the inter-layer residue 681 to yield the tone mapped HDR block 609.

Determining Optimal Scaling Factor

Figure 7:
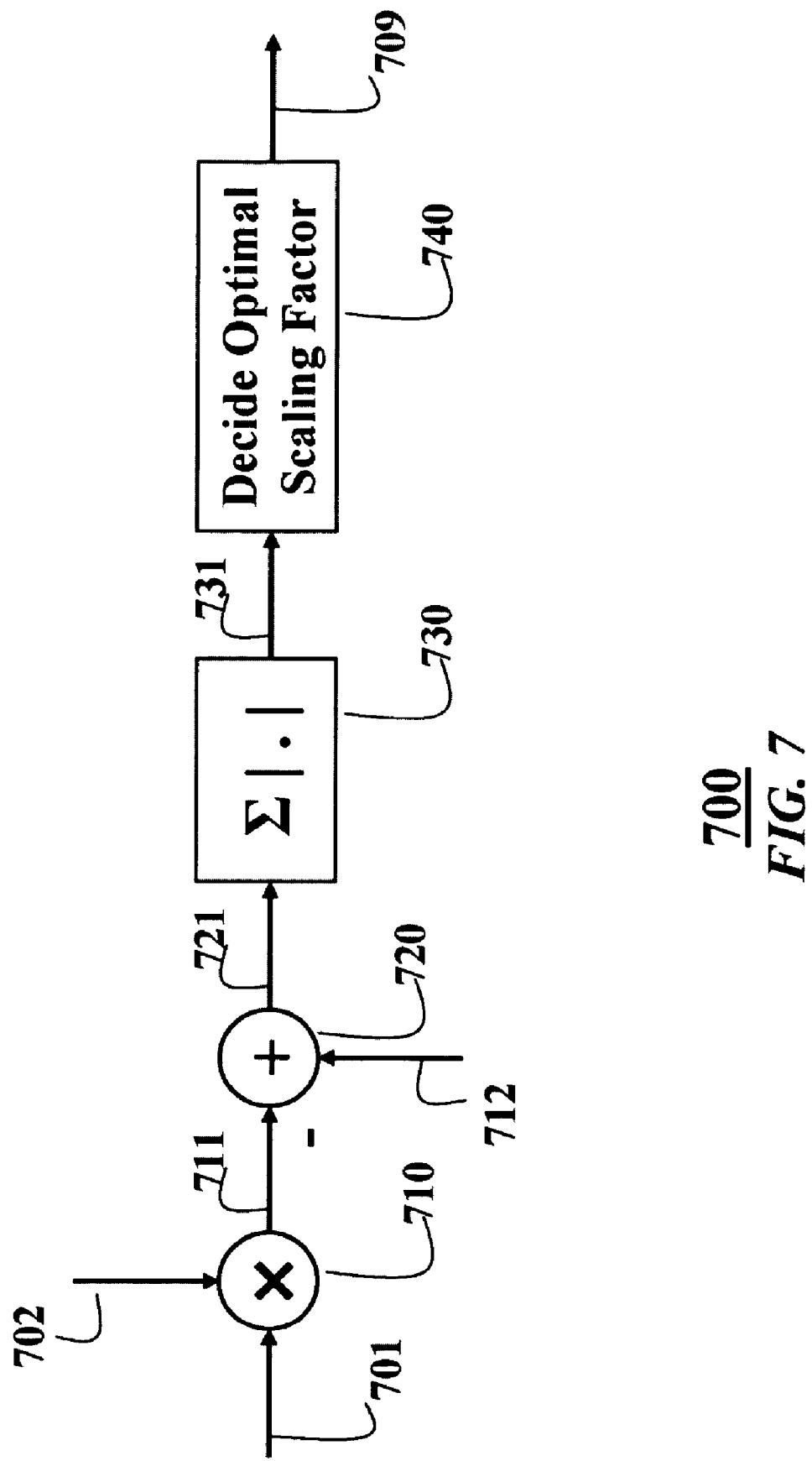
FIG. 7 is a block diagram of a process for determining an optimal block-based scaling factor for inverse tone mapping according to an embodiment of the invention.

FIG. 7 shows a process 700 for determining the optimal scaling factor for each block of each color channel according to an embodiment of the invention. The steps in the process are repeated for each candidate scaling factor in the set of candidate scaling factors. The pixel intensity values 501 are multiplied 710 by the candidate scaling factor 702 to yield scaled pixel intensity values 711. A difference 721 between the scaled pixel intensity values 711 and the input pixel intensity values 712 are determined 720 on a pixel-by-pixel basis. A sum of absolute difference (SAD) 731 of all pixel intensity values within the current block is determined 730. The SAD 731 generated by all scaling factor candidates are compared 740, and the scaling factor associated with the minimum SAD is selected as the optimal scaling factor for the block.

Instead of using the SAD criterion in the above process, alternative measurements, such as mean square error (MSE), or sum of absolute transformed difference (SATD) can also be used.

Another embodiment uses a least square (LS) fitting. In this way, the repetition for each scaling factor can be avoided to reduce the computational complexity when number of candidate scaling factors is large.

Variable Blocks of Different Sizes

So far, we have described inverse tone mapping for a fixed block size. Now, we describe the inverse tone mapping applied to an adaptive block size. That is, the blocks have different sizes, and the inverse tone mapping is applied accordingly.

In images or video frames, various regions may be acquired under different lighting conditions. Consequently, different tone maps can be utilized in those regions when converting HDR (in higher bit-depth) images with a higher bit-depth to LDR images with a lower bit-depth. Likely, those regions are distributed in the images with various sizes. Therefore, we adapt our inverse tone mapping to blocks of different sizes that substantially conform to the various regions.

The inverse tone mapping, i.e., inter-layer prediction from LDR images to HDR images, should be adjustable according to the forward tone maps used, in order to achieve higher coding efficiency. That is, the fixed block size inverse tone mapping described above should be extended to include inverse tone mapping parameters, i.e., the scaling factor, the offset, and a prediction mode should be adaptive in the different regions having the various sizes.

The most precise inter-layer prediction would be, that, each pixel is assigned a set of mapping parameter, i.e., the scaling factor, the offset, and the prediction mode. However, this would result in very poor coding efficiency, because of an excessive overhead bit rate is required for the mapping parameters. Similarly, for small blocks, the mapping parameters also increases the overhead. Using larger block sizes can decrease the overhead, however, the inaccurate prediction may result in greater residues and thus a higher bit rate.

Hence, a better coding efficiency can be achieved by using an adaptive block size in the different regions, i.e., using a larger block size for regions with uniformly tone mapping, and a smaller block size for regions with non-uniform tone mapping.

There are many ways to determine an appropriate block size. We describe two efficient methods as examples, although other methods can also be applied to this framework.

Block Size by Rate-Distortion Cost (RDC)

Figure 8:
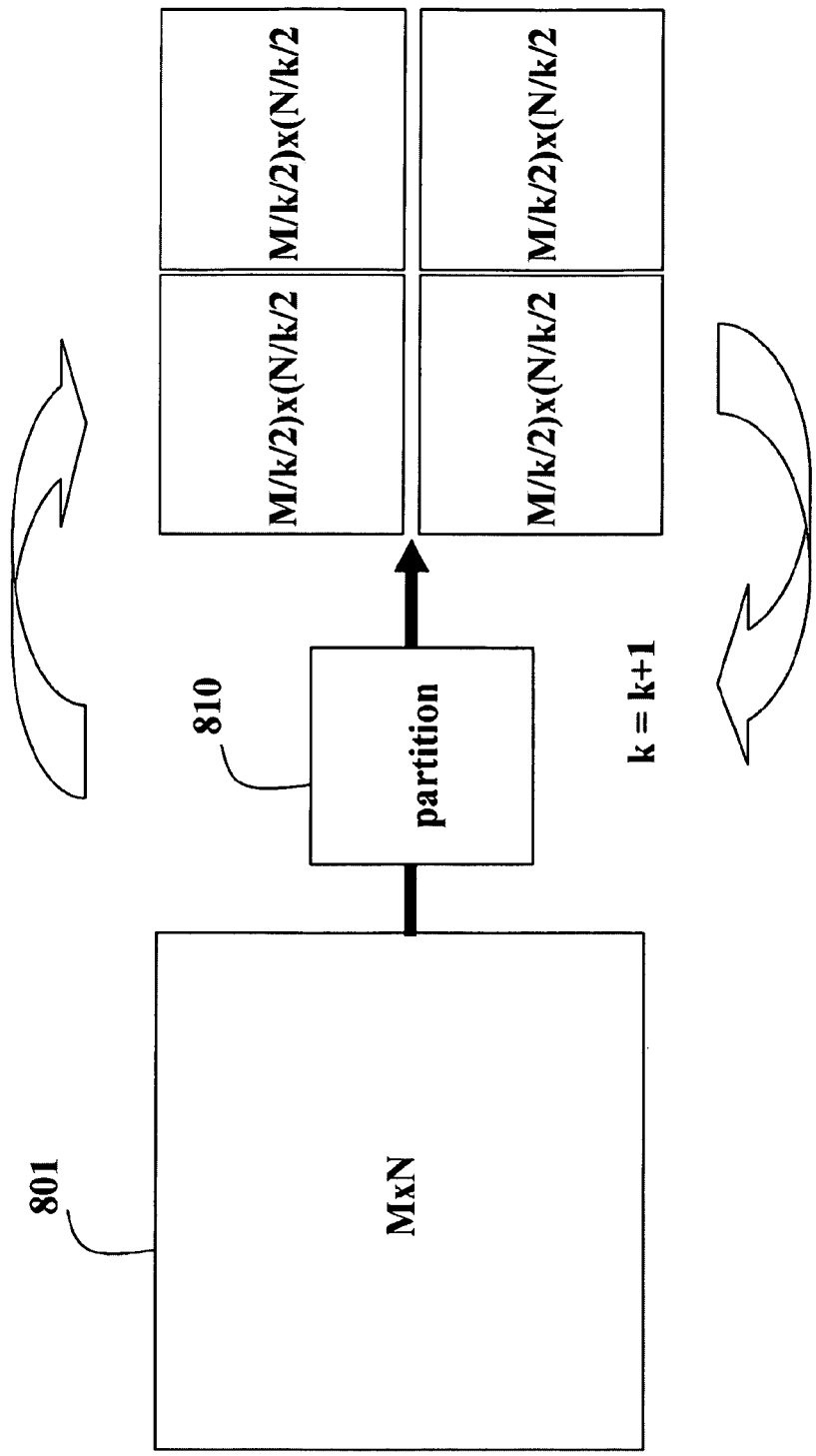
FIG. 8 is a block diagram of a process for applying inverse tone mapping to different sized blocks.

Generally and as shown in FIG. 8, a maximum block size is M×N pixels 801, e.g., when M=N=16, that is a macroblock. The optimal scaling factor, as well as the offset for this M×N block can be obtained as described in the previous section, e.g., as described and shown in FIG. 7.

A Rate-Distortion Cost (RDC) is measured as D+λR, where the distortion D is normally measured in MSE, the rate R is the total number of bits used to encode a particular block, including the overhead bits for encoding scaling factor and offset, and λ is a Lagrangian multiplier. Then, the M×N block is partitioned 810 into four smaller sub-blocks 802, each at size (M/2)×(N/2). The optimal scaling factors as well as the offsets for these four smaller blocks are obtained similarly.

The RDC of each sub-block is determined independently, and the RDC for all four blocks are summed. We compare the RDC of the entire M×N block, denoted as RDC(M,N), and the summed RDCs of the four (M/2)×(N/2) sub-blocks, denoted as RDC(M/2,N/2)).

If RDC(M,N)≦RDC(M/2,N/2), then the block size M×N is retained. Otherwise, we continue to partition each (M/2)×(N/2) sub-block into four (M/4)×(N/4) smaller sub-blocks. Thus, each M×N block now includes sixteen (M/4)×(N/4) sub-blocks. Then, we calculate the RDC of each (M/4)×(N/4) sub-block and sum as before, i.e., RDC(M/4, N/4). If RDC (M/2, N/2)≦RCD(M/4, N/4), then the block size is (M/2)×(N/2). Otherwise, we continue reducing the block size by half in each vertical and horizontal dimension, until RCD(M/$2^k$, N/$2^k$)≦RCD(M/$2^{k+1}$, N/$2^{k+1}$), where k is a non-negative integer and increased by 1 for each iteration.

Block Size by Scaling Factors

A maximum block size is M×N, and a minimum block size is m×n. Thus, each M×N block can be partitioned into a total of (M/m)×(N/n) sub-blocks. For simplicity of this description, we make (M/m) and (N/n) both be a power of two.

The optimal scaling factor for the m×n sub-blocks are first determined as described above. Then, the sub-blocks, which have identical scaling factors are merged into one sub-block. The scaling factor is re-calculated for the merged sub-block. Note that only the sub-blocks, whose relative positions are left and right, and top and bottom, are merged. The top/left sub-block must be in an "even" position. That is, the sub-block index of the top/left sub-block must be even numbers (i.e., 0, 2, 4 . . . ) in both the horizontal and vertical dimensions. It may require several iterations to merge all possible sub-blocks.

Comparison to Prior Art

In contrast to the prior art systems, the invention has significant differences and advantages. Our inverse tone mapping is block based, while the method described by Winken et al. is global. Thus, the inverse tone mapping according to the invention is more suitable to ROI applications, while maintaining a high quality.

Our inverse tone mapping can also be applied to images where various regions have different lighting conditions by using different block sizes conforming to the regions. The block sizes can be based on rate-distortion encoding costs or scaling factors.

Also our inverse tone mapping technique does not require an initial delay before decoding and rendering. As a result, the coding scheme can be applied to real-time applications.

Our inverse tone mapping technique is also applied independent of the (forward) tone mapping technique that has been applied to determine the (LDR) pixel intensity values. This is important because, in practice, the decoder does not have knowledge of the tone mapping that was applied during the encoding.

Compared to the method described by Segall and Su, our inverse tone mapping parameters include a prediction direction, a scaling factor, and an offset value for each color channel of each block of each image. The prior art applies the same scaling factor and offset value to two chrominance components. Therefore, our inverse tone mapping method is more general to multi-color-channel applications, especially when different bit-depths are used for different color channels. It should be noted that out method can also be applied when more than three color channels are used.

Our inverse tone mapping predicts the block offset value, as well as the scaling factor, from adjacent blocks. The prior art does not predict an offset value. Instead, the offset value is coded as a DC coefficient in the frequency domain. By predicting offset values, our inverse tone mapping requires minimal overhead and leads to higher coding efficiency.

According to the invention, a range of the candidate scaling factors can dynamically be adapted according to the applications or the bit-depth of the input images. In the prior art, the scaling factor set is pre-defined. Therefore, the invention applies more generally to applications and a wider range of image sources at different bit-depths.

It is to be understood that various other adaptations and modifications can be made within the spirit and scope of the invention. Therefore, it is the object of the appended claims to cover all such variations and modifications as come within the true spirit and scope of the invention.

We claim:

1. A method for inverse tone mapping of an image in a decoder, in which the image includes a plurality of blocks, comprising for each block of each color channel of the image the steps of:
   determining a scaling factor for a current block by adding a predicted scaling factor for the current block to a difference between the predicted scaling factor and the scaling factor of an adjacent block;
   determining an offset value for the current block by adding a predicted offset for the current block to a difference between the predicted offset value and the offset value of the adjacent block; and
   applying the scaling factor and the offset value to pixel intensity values of the current block to produce a mapped block in which a bit-depth of the mapped block is greater than the bit-depth of the current block, in which the blocks have different sizes, wherein the steps of the method are performed in the decoder.

2. The method of claim 1, in which the inverse tone mapping as adapted to the block having the different sizes.

3. The method of claim 2, further comprising:
   acquiring the image such that various regions the image have different lighting conditions, and the different sizes of the blocks are adapted to the various regions.

4. The method of claim 3, in which a larger block size is used for region with uniform tone mapping, and a smaller block size is used regions with non-uniform tone mapping.

5. The method of claim 1, in which the different sizes depend on a rate distortion cost (RDC) of encoding the blocks.

6. The method of claim 5, in which the RDC is D+λR, where D is distortion measured in MSE, R is a rate is a total number of bits used to encode a particular block, including overhead bits for encoding the scaling factor and the offset value, and λ is a Lagrangian multiplier.

7. The method of claim 5, further comprising:
   determining the RDC for the particular block as RDC(M×N), where M and N are dimensions of the particular block in terms of pixels; and
   partitioning the particular block into sub-blocks as RDC (M/2×N/2);
   determining a sum of the RDCs for the sub-blocks blocks as RDC(M/2×N/2), and if RDC(M,N)≦RDC(M/2,N/2), then retaining the size of the particular block as M×N, and otherwise iterating the partitioning and determining of the sum until RCD(M/k, N/k)≦RCD(M/k/2, N/k/2), where k is a non-negative integer and increased by 1 for each iteration.

8. The method of claim 1, in which the different sizes depend on a rate distortion cost (RDC) of encoding the blocks.

9. The method of claim 1, in which the different sizes depend on the scaling factors of the blocks.

10. The method of claim 9, in which a maximum block size is M×N and a minimum block size is m×n, and further comprising:
   partitioning a particular block M×N block into m×n sub-blocks;
   determining an optimal scaling factor for each sub-block; and
   merging the sub-blocks having identical optimal scaling factors.

11. The method of claim 1, in which the determining and applying steps are performed for a sequence of images.

* * * * *